US012733040B2

(12) United States Patent
Toft et al.

(10) Patent No.: US 12,733,040 B2
(45) Date of Patent: Sep. 8, 2026

(54) USER DEVICE POSITIONING

(71) Applicant: Nokia Technologies Oy, Espoo (FI)

(72) Inventors: Morten Toft, Aalborg (DK); Samantha Caporal Del Barrio, Aalborg (DK); Johannes Harrebek, Aalborg (DK); Simon Svendsen, Aalborg (DK)

(73) Assignee: Nokia Technologies Oy, Espoo (FI)

(*) Notice: Subject to any disclaimer, the term of this patent is extended or adjusted under 35 U.S.C. 154(b) by 449 days.

(21) Appl. No.: 18/357,559

(22) Filed: Jul. 24, 2023

(65) Prior Publication Data

US 2024/0049295 A1 Feb. 8, 2024

(30) Foreign Application Priority Data

Aug. 4, 2022 (EP) .................................... 22188870

(51) Int. Cl.
*H04W 74/0833* (2024.01)
*H04W 64/00* (2009.01)

(52) U.S. Cl.
CPC ....... *H04W 74/0833* (2013.01); *H04W 64/00* (2013.01)

(58) Field of Classification Search
CPC ............. H04W 74/0833; H04W 64/00; H04W 74/002; G01S 5/00
See application file for complete search history.

(56) References Cited

U.S. PATENT DOCUMENTS 10,863,473 B2 12/2020 Wong et al.
11,115,103 B2 9/2021 Guo et al.
12,335,760 B2 6/2025 Andrianov et al.
(Continued)

FOREIGN PATENT DOCUMENTS

EP 4117358 A1 1/2023
WO 2018/028925 A1 2/2018
(Continued)

OTHER PUBLICATIONS

Extended European Search Report received for corresponding European Patent Application No. 23186302.8, dated Jan. 3, 2024, 6 pages.
Notice of Allowance received for corresponding European Patent Application No. 22188870.4 , dated Apr. 14, 2025, 7 pages.
(Continued)

*Primary Examiner* — Kibrom T Hailu
(74) *Attorney, Agent, or Firm* — McCarter & English, LLP

(57) ABSTRACT

An apparatus, method and comprising device is described, comprising: in response to receiving, at a user device, a positioning message from one or more of a plurality of network nodes, selecting a first network node from the plurality of network nodes, wherein the first network node is selected based on determining that highest transmission power is required for transmission of a channel preamble message to said first network node in comparison with transmission to other ones of the plurality of network nodes; determining a first group of network nodes from the plurality of network nodes, wherein the first group of network nodes are suitable for receiving a first group channel preamble message from the user device during a same random access channel occasion as that of the first network node; and transmitting the first group channel preamble message to the first group of network nodes at a first random access channel occasion.

20 Claims, 11 Drawing Sheets

(56) References Cited

U.S. PATENT DOCUMENTS

| | | | | |
|---|---|---|---|---|
| 2013/0083759 | A1* | 4/2013 | Rong | H04W 48/20<br>370/329 |
| 2019/0182794 | A1* | 6/2019 | Wong | H04W 52/0216 |
| 2020/0229130 | A1 | 7/2020 | Keating et al. | |
| 2021/0058971 | A1 | 2/2021 | MolavianJazi et al. | |
| 2021/0105833 | A1 | 4/2021 | Freda et al. | |
| 2021/0160923 | A1* | 5/2021 | Zhang | H04W 74/0833 |
| 2021/0368538 | A1 | 11/2021 | Yerramalli et al. | |
| 2022/0061097 | A1 | 2/2022 | Kwak et al. | |
| 2022/0116902 | A1 | 4/2022 | Liu et al. | |
| 2022/0167301 | A1 | 5/2022 | Goyal et al. | |
| 2024/0049164 | A1 | 2/2024 | Toft et al. | |
| 2024/0049295 | A1 | 2/2024 | Toft et al. | |
| 2025/0071718 | A1 | 2/2025 | Harrebek et al. | |

FOREIGN PATENT DOCUMENTS

| | | | |
|---|---|---|---|
| WO | 2020/168573 | A1 | 8/2020 |
| WO | 2022/006744 | A1 | 1/2022 |
| WO | 2022/007719 | A1 | 1/2022 |
| WO | 2022/020059 | A1 | 1/2022 |
| WO | 2022/031457 | A1 | 2/2022 |
| WO | 2022/057997 | A1 | 3/2022 |
| WO | 2022/078763 | A1 | 4/2022 |
| WO | 2022/081893 | A1 | 4/2022 |
| WO | 2023/108377 | A1 | 6/2023 |

OTHER PUBLICATIONS

"Revised SID on Study on expanded and improved NR positioning", 3GPP TSG RAN Meeting #94e, RP-213588, Agenda: 8.6.1, Intel, Dec. 6-17, 2021, 5 pages.

"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.

"3rd Generation Partnership Project; Technical Specification Group Radio Access Network; NR; Physical layer procedures for control (Release 17)", 3GPP TS 38.213, V17.1.0, Mar. 2022, pp. 1-245.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.0.0, Mar. 2022, pp. 1-132.

"3rd Generation Partnership Project; Technical Specification Group Radio Access Network; NR; Physical channels and modulation (Release 17)", 3GPP TS 38.211, V17.1.0, Mar. 2022, pp. 1-135.

"Performance evaluation for beam grouping principles", 3GPP TSG RAN WG1 Meeting #87, R1-1611416, Agenda: 7.1.3.3, ZTE, Nov. 14-18, 2016, 7 pages.

"Provisioning of TRS occasions to Idle/Inactive UEs", 3GPP TSG RAN WG1 #106bis-e, R1-2110137, Agenda: 8.7.1.2, Ericsson, Oct. 11-19, 2021, pp. 1-16.

"Open issues for RRC", 3GPP TSG-RAN WG2 #109 electronic, R2-2002125, Agenda: 6.13.1, Ericsson, Feb. 24-Mar. 6, 2020, pp. 1-13.

"RRM and mobility support", 3GPP TSG RAN WG4 Meeting #80-bis, R4-168037, Agenda: 10.6.1.2, Ericsson, Oct. 10-14, 2016, pp. 1-3.

Pereira et al., "PRACH Power Control Mechanism for Improving Random-Access Energy Efficiency in Long Term Evolution", IEEE 10th Latin-American Conference on Communications (LATINCOM), Nov. 14-16, 2018, 6 pages.

"FL summary #2 for AI 9.5.2.3—low power high accuracy positioning", 3GPP TSG RAN WG1 #109-e, R1-2205354, Agenda: 9.5.2.3, CMCC, May 9-20, 2022, pp. 1-85.

Office action received for corresponding Finnish Patent Application No. 20225698, dated Dec. 22, 2022, 10 pages.

"Potential positioning enhancements", 3GPP TSG RAN WG1 #103-e, R1-2008083, Agenda: 8.5.3, Xiaomi, Oct. 26-Nov. 13, 2020, 5 pages.

Extended European Search Report received for corresponding European Patent Application No. 22188870.4, dated Jan. 27, 2023, 9 pages.

Office action received for corresponding Finnish Patent Application No. 20225698, dated Apr. 25, 2023, 7 pages.

* cited by examiner

| | | TRP1 | | TRP2 | |
|---|---|---|---|---|---|
| | | SSB#1 RO#1 | SSB#2 RO#2 | SSB#1 RO#1 | SSB#2 RO#2 |
| Panel P1 | UE measured RSRP (dBm): | -100 | -95 | -86 | -91 |
| | UE Required TxPower (dBm): | 20 | 15 | 6 | 11 |
| Panel P2 | UE measured RSRP (dBm): | -106 | -101 | -80 | -85 |
| | UE Required TxPower (dBm): | 26 | 21 | 0 | 5 |

USER DEVICE POSITIONING

RELATED APPLICATION

This application claims priority to the European patent application number 22188870.4, filed on Aug. 4, 2022, the content of which is incorporated herein by reference in its entirety.

FIELD

The present specification relates to providing information for determining user device position(s) to a positioning module in a mobile communications system.

BACKGROUND

Arrangements for providing or obtaining positioning information relating to user devices of a mobile communications environment are known. There remains a need for improvement in how positioning information is provided or obtained.

SUMMARY

In a first aspect, this specification provides an apparatus comprising means for performing: in response to receiving, at a user device (e.g. a user equipment (UE)), a positioning message from one or more of a plurality of network nodes (e.g. base stations (gNBs) and/or transmission-reception points (TRPs), selecting a first network node from the plurality of network nodes, wherein the first network node is selected based on determining that highest transmission power is required for transmission of a channel preamble message to said first network node in comparison with transmission to other ones of the plurality of network nodes; determining a first group of network nodes from the plurality of network nodes, wherein the first group of network nodes are suitable for receiving a first group channel preamble message (e.g. PRACH preamble message) from the user device during a same random access channel occasion as that of the first network node; and transmitting the first group channel preamble message to the first group of network nodes at a first random access channel occasion.

In some examples, the positioning message comprises information of a first number of network nodes (e.g. specified by a positioning module, such as a location management function (LMF) module) for transmission of the group channel preamble message.

Some examples include determining whether the first group channel preamble message has been transmitted to all network nodes from the first number of network nodes; in the event that the first group channel preamble message has not been transmitted to all network nodes from the first number of network nodes, determining one or more subsequent groups of network nodes, each group of network nodes being suitable for receiving a subsequent respective group channel preamble message from the user device during a respective same random access channel occasion; and transmitting each of the subsequent respective group channel preamble message to each of the one or more subsequent groups of network nodes until a respective group channel preamble message has been sent to all network nodes from the first number of network nodes.

In some examples, the positioning message is based, at least partially, on a location determining information request (e.g. Positioning PRACH request) transmitted by a positioning module (e.g. location management function (LMF) module) to one or more of the plurality of network nodes, wherein the location determining information request comprising parameters comprising one or more of a reference signal received power threshold, the first number of network nodes for transmission of the group channel preamble message, identity of the one or more network nodes configured for receiving the group channel preamble message, and expected uplink preamble receiving power.

In some examples, the determination of the first group of network nodes is based, at least in part, on one or more of the parameters comprised within the location determining information request.

In some examples, the first group channel preamble message is transmitted to the first group of network nodes on a single user device panel.

Some examples include transmitting a first message (e.g. initialization message for indicating UE capability) to a positioning module (e.g. location management function (LMF) module), wherein the first message provides indication that the user device supports group channel preamble message transmission.

In some examples, the means of the apparatus are suitable for allowing the user device is to transmit the first group preamble message while the user device in an idle mode.

In some examples, selecting the first network node comprises measuring signal power for the plurality of network nodes for one or more antenna panels of the user device.

The means may comprise at least one processor; and at least one memory storing instructions that, when executed by the at least one processor, cause the apparatus at least to cause the performance of the apparatus.

In a second aspect, this specification provides a method comprising: in response to receiving, at a user device, a positioning message from one or more of a plurality of network nodes, selecting a first network node from the plurality of network nodes, wherein the first network node is selected based on determining that highest transmission power is required for transmission of a channel preamble message to said first network node in comparison with transmission to other ones of the plurality of network nodes; determining a first group of network nodes from the plurality of network nodes, wherein the first group of network nodes are suitable for receiving a first group channel preamble message from the user device during a same random access channel occasion as that of the first network node; and transmitting the first group channel preamble message to the first group of network nodes at a first random access channel occasion.

In some examples, the user device is suitable for transmitting the first group preamble message while the user device in an idle mode.

In some examples, the positioning message comprises information of a first number of network nodes (e.g. specified by a positioning module, such as a location management function (LMF) module) for transmission of the group channel preamble message.

Some examples include determining whether the first group channel preamble message has been transmitted to all network nodes from the first number of network nodes; in the event that the first group channel preamble message has not been transmitted to all network nodes from the first number of network nodes, determining one or more subsequent groups of network nodes, each group of network nodes being suitable for receiving a subsequent respective group channel preamble message from the user device during a respective same random access channel occasion;

and transmitting each of the subsequent respective group channel preamble message to each of the one or more subsequent groups of network nodes until a respective group channel preamble message has been sent to all network nodes from the first number of network nodes.

In some examples, the positioning message is based, at least partially, on a location determining information request (e.g. Positioning PRACH request) transmitted by a positioning module (e.g. location management function (LMF) module) to one or more of the plurality of network nodes, wherein the location determining information request comprising parameters comprising one or more of a reference signal received power threshold, the first number of network nodes for transmission of the group channel preamble message, identity of the one or more network nodes configured for receiving the group channel preamble message, and expected uplink preamble receiving power.

In some examples, the determination of the first group of network nodes is based, at least in part, on one or more of the parameters comprised within the location determining information request.

In some examples, the first group channel preamble message is transmitted to the first group of network nodes on a single user device panel.

Some examples include transmitting a first message (e.g. initialization message for indicating UE capability) to a positioning module (e.g. location management function (LMF) module), wherein the first message provides indication that the user device supports group channel preamble message transmission.

In some examples, selecting the first network node comprises measuring signal power for the plurality of network nodes for one or more antenna panels of the user device.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: in response to receiving, at a user device, a positioning message from one or more of a plurality of network nodes, selecting a first network node from the plurality of network nodes, wherein the first network node is selected based on determining that highest transmission power is required for transmission of a channel preamble message to said first network node in comparison with transmission to other ones of the plurality of network nodes; determining a first group of network nodes from the plurality of network nodes, wherein the first group of network nodes are suitable for receiving a first group channel preamble message from the user device during a same random access channel occasion as that of the first network node; and transmitting the first group channel preamble message to the first group of network nodes at a first random access channel occasion.

In a sixth aspect, this specification describes a computer-readable medium (such as a non-transitory computer-readable medium) comprising program instructions stored thereon for performing at least the following: in response to receiving, at a user device, a positioning message from one or more of a plurality of network nodes, selecting a first network node from the plurality of network nodes, wherein the first network node is selected based on determining that highest transmission power is required for transmission of a channel preamble message to said first network node in comparison with transmission to other ones of the plurality of network nodes; determining a first group of network nodes from the plurality of network nodes, wherein the first group of network nodes are suitable for receiving a first group channel preamble message from the user device during a same random access channel occasion as that of the first network node; and transmitting the first group channel preamble message to the first group of network nodes at a first random access channel occasion.

In a seventh aspect, this specification describes an apparatus comprising: at least one processor; and at least one memory including computer program code which, when executed by the at least one processor, causes the apparatus to: in response to receiving, at a user device, a positioning message from one or more of a plurality of network nodes, select a first network node from the plurality of network nodes, wherein the first network node is selected based on determining that highest transmission power is required for transmission of a channel preamble message to said first network node in comparison with transmission to other ones of the plurality of network nodes; determine a first group of network nodes from the plurality of network nodes, wherein the first group of network nodes are suitable for receiving a first group channel preamble message from the user device during a same random access channel occasion as that of the first network node; and transmit the first group channel preamble message to the first group of network nodes at a first random access channel occasion.

In an eighth aspect, this specification describes an apparatus comprising: a first module configured to select a first network node from a plurality of network nodes, in response to receiving, at a user device, a positioning message from one or more of the plurality of network nodes, wherein the first network node is selected based on determining that highest transmission power is required for transmission of a channel preamble message to said first network node in comparison with transmission to other ones of the plurality of network nodes; a second module to determine a first group of network nodes from the plurality of network nodes, wherein the first group of network nodes are suitable for receiving a first group channel preamble message from the user device during a same random access channel occasion as that of the first network node; and a third module to transmit the first group channel preamble message to the first group of network nodes at a first random access channel occasion.

BRIEF DESCRIPTION OF THE DRAWINGS

Example embodiments will now be described, by way of example only, with reference to the following schematic drawings, in which.

DETAILED DESCRIPTION

Figure 1:
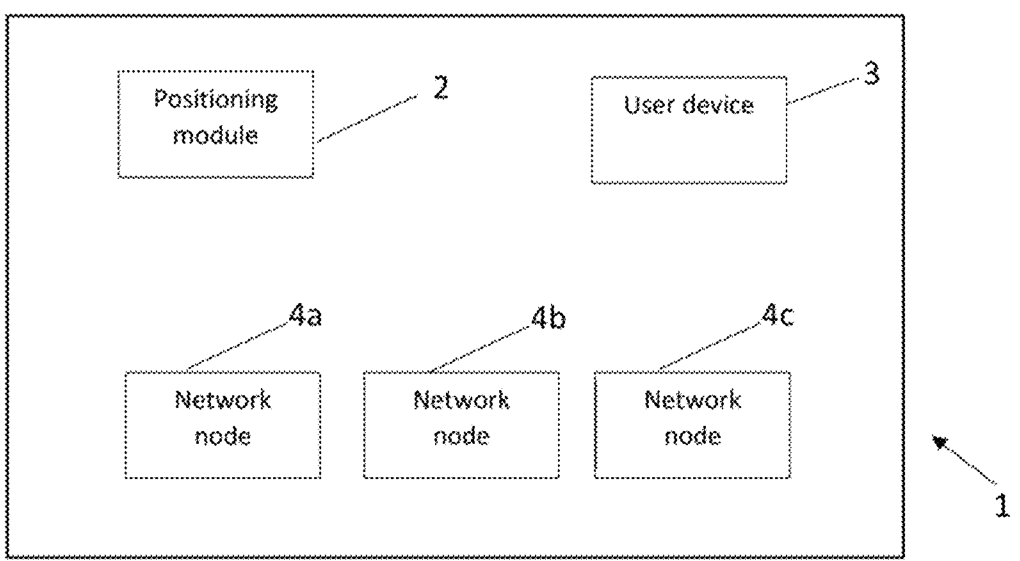
FIGS. 1 and 2 are block diagrams of systems in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 1, in accordance with an example embodiment. System 1 comprises a positioning module 2 (e.g. a location management function (LMF) module), a user device 3 (e.g. user equipment (UE)), and a plurality of network nodes 4 (e.g. network nodes 4*a*, 4*b*, and 4*c*; e.g. base stations (gNB)). The system 1 may be a mobile communications system (e.g. 5G network system), where positions of user devices, such as the user device 3, may be determined by positioning module 2, for example in order to enable efficient use of network resources.

By way of example, in 3GPP 5G NR (3rd Generation Partnership Project 5G, New Radio) standards, one or more of the following parameters may be used for determining UE positions: Downlink Time Difference of Arrival (DL-TDOA); Uplink Time Difference of Arrival (UL-TDOA); Downlink Angle of Departure (DL-AoD); Uplink Angle of Arrival (UL-AoA); Multi-cell Round Trip Time (Multi-RTT).

Figure 2:
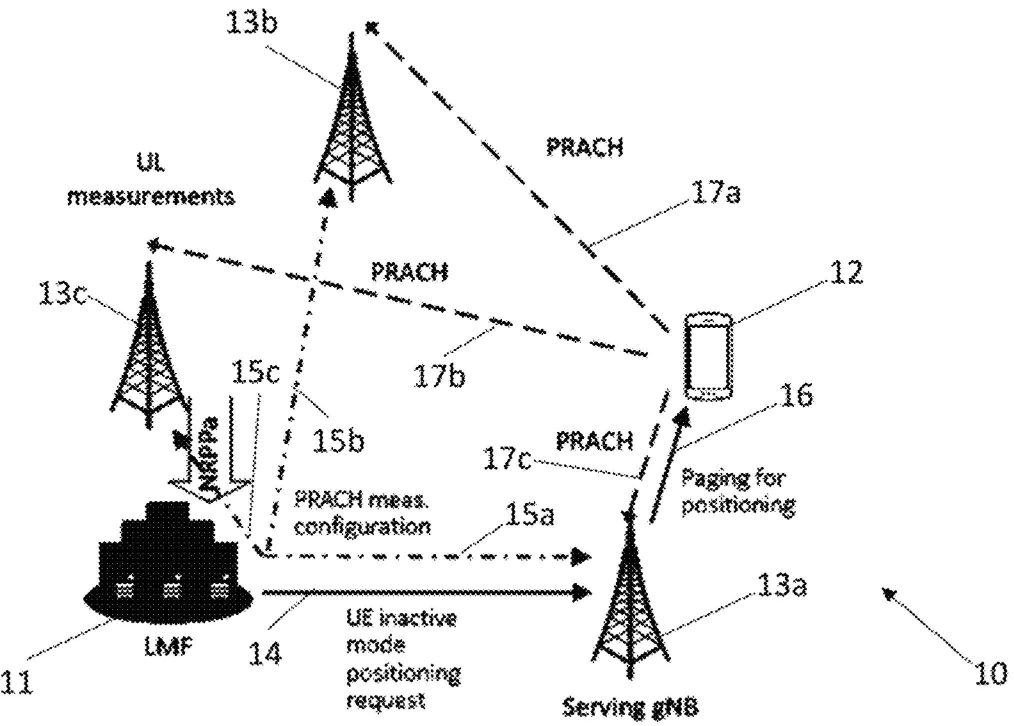

FIG. 2 is a block diagram of a system, indicated generally by the reference numeral 10, in accordance with an example embodiment. System 10 comprises a location management function LMF) module 11, a user device 12, and a plurality of base stations (gNB) 13*a*, 13*b*, and 13*c*. The system 10 may be used for positioning (e.g. uplink positioning) of user devices, such as user device 12, that are in idle or inactive state (e.g. radio resource control (RRC) idle and RRC inactive UEs). A preamble of random access channel (PRACH) may be used as an uplink positioning signal for idle and/or inactive UEs. For example, the LMF module 11 may send a request to a serving gNB 13*a* for UE positioning for UE 12 in idle and/or inactive mode, as shown by the arrow 14. The LMF module 11 may further send PRACH configuration messages to the plurality of gNBs 13*a*, 13*b*, and 13*c*, as shown by the arrows 15*a*, 15*b*, and 15*c* respectively. The serving gNB 13*a* may then page the UE 12 for positioning (e.g. idle/inactive mode positioning), as shown by the arrow 16. In response to the paging, the UE 12 may send PRACH messages to the plurality of gNBs 13*a*, 13*b*, and 13*c*, as shown by the arrows 17*a*, 17*b*, and 17*c* respectively. The gNBs 13*a*, 13*b*, and 13*c* may then measure one or more of the parameters such as time of arrival (TOA), angle of arrival (AOA), or the like based on the received PRACH messages, and report the measurements to the LMF 11. The LMF 11 may then perform positioning estimate for the UE 12 based on the measurement reports received from the gNBs.

In some examples, a UE, such as the UE, 12 may measure the reference signal received power (RSRP) of the beams in synchronization signal (SS) burst, decode cell-specific information and initiate initial access procedure by triggering random access (RA) transmission over the best measured synchronization signal block (SSB) beam (or by selecting one of the SSBs above a RSRP threshold). The RA preamble transmission may take place over a physical Random Access Occasion (RO) and corresponding Random Access Channel (RACH) configuration. By detecting which random access occasion the UE is transmitting onto, the network (e.g. LMF 11) may determine which SSB Beam has been selected by the UE.

The above-mentioned RO may be a resource specified in time and frequency domains available for the transmission of RACH preamble. For example, in 3GPP new radio (NR/5G), SSB indices are associated with ROs via higher-layer signalling. Mapping may be flexible in order to accommodate different network deployments and loads. For example, the mapping between SSB and RO may be defined by one or more parameters such as SSB-perRACH-Occasion and code block (CB)-PreamblePerSSB which may specify the number of SSBs mapped to one RO and the number of preamble indices associated with a single SSB; and msg1-FDM which specifies the number of ROs in frequency domain. Regardless of how the mapping is configured, upon reception of the cell-specific RACH configuration, each UE may determine which preambles can be chosen for transmission in which RO, when the selection of an SSB beam has been performed. The gNB can then perform preamble reception and detection in order to report measurement results to the LMF.

Figure 3:
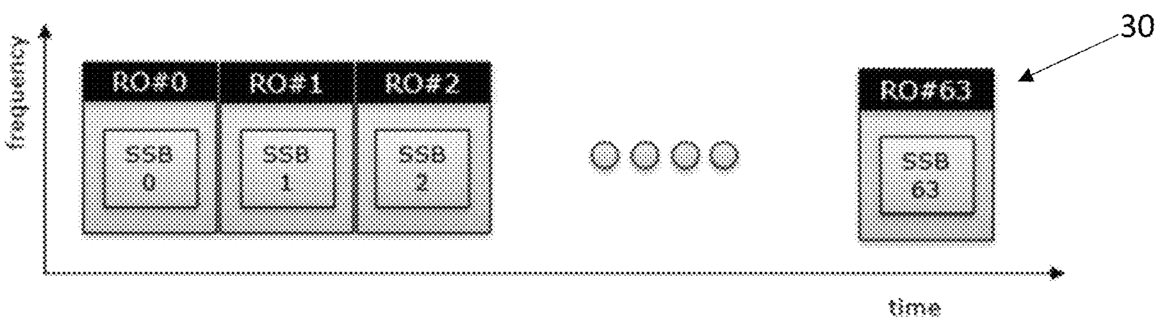
FIG. 3 is an illustration of an example time-frequency plot.

FIG. 3 is an illustration, indicated generally by the reference numeral 30, of an example time-frequency plot. The illustration 30 shows an example of mapping between a synchronization signal(SS)/physical broadcast channel (PBCH) block index (SSB) and PRACH occasion (RO).

A UE (such as the UE12) may select PRACH occasion based on the best SS/PBCH received from the base station (e.g. gNB or transmission-reception point (TRP)) (e.g. as described in 3GPP 38.213 section 8.1 "Random access preamble"). This is to ensure that the gNB will have its receiver (RX) PRACH narrow beam pointing in the direction of the UE, when the UE is sending the PRACH preamble. There can be up to 64 SS/PBCH block indexes. If a UE is receiving the best signal (e.g. best RSRP/RSRQ) from a TRP on the SSBx, the UE is supposed to use the RO #x for any PRACH preamble transmission.

When the UE is transmitting the uplink (UL) PRACH preamble to the TRP, the transmit power may be defined by an open loop power control (e.g. as defined in 3GPP 38.213 sec. 7.4). It defines the UL power level to be depending on the pathloss estimated by the UE. The UL power may compensate for the pathloss estimated on the channel, and hence the target power received at the TRP may be independent of the distance between the TRP and the different UEs sending the PRACH preamble preambleInitialReceivedTargetPower. The higher pathloss estimated (lower measured RSRP), the higher UL transmit power.

In some examples, the time (RACH Occasion (RO)) when the UE transmits PRACH preamble may depend on which gNB beam (SSB beam) is chosen by the UE (i.e. received with highest power). The exact time (RACH occasion) may be likely to be different for each TRP, and hence the UE may transmit several RACH preambles dedicated to each specific TRP, while also keeping relevant UE hardware powered on for the total duration of all target(s) RO(s), which may not be ideal for a UE in idle/inactive state.

Figure 4:
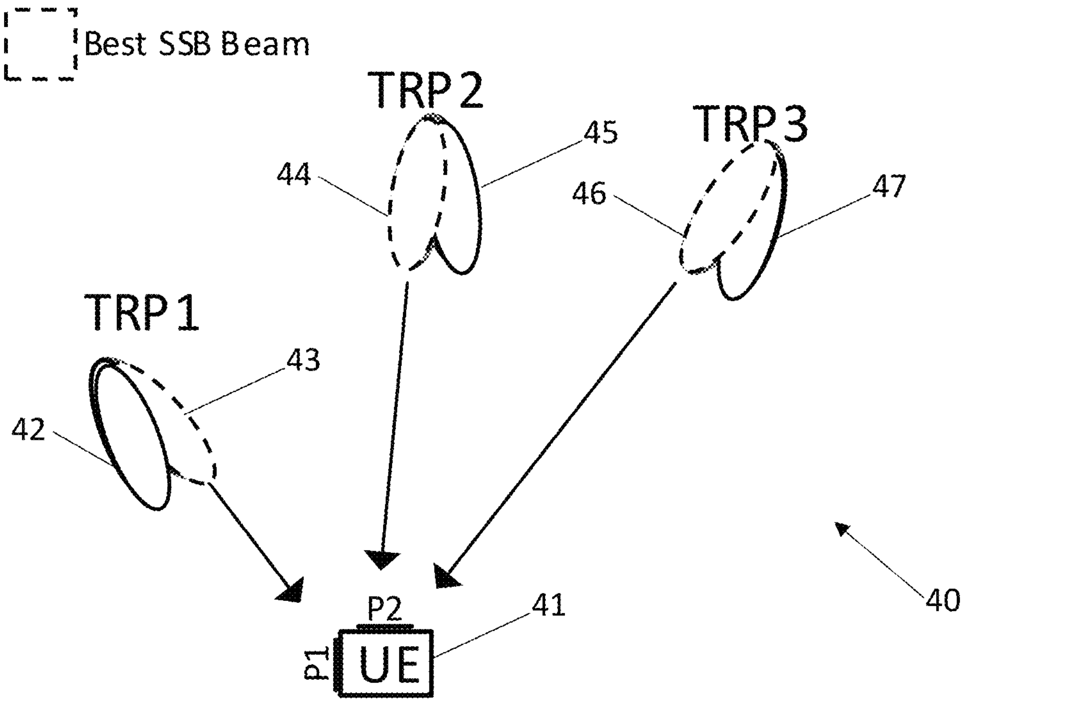
FIG. 4 is a block diagram of a system in accordance with an example embodiment.
Figure 5:
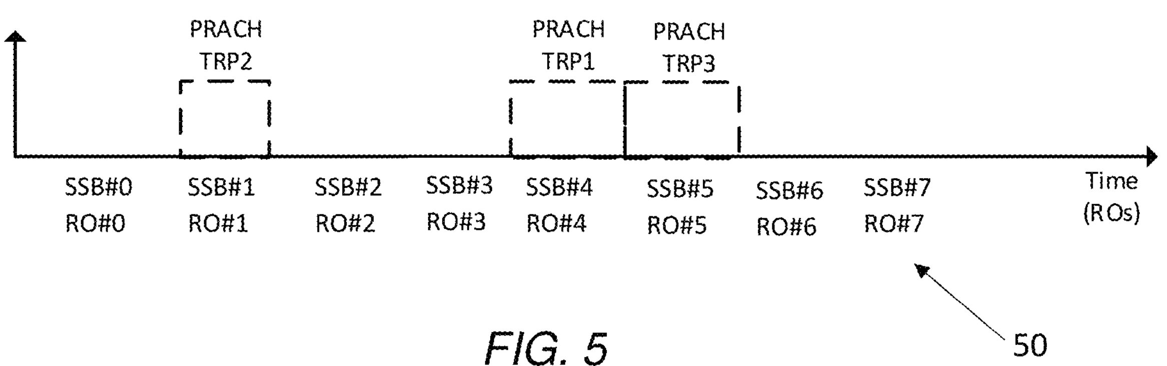
FIG. 5 is an illustration of an example plot for sending channel preamble messages.

FIG. 4 is a block diagram of an example system, indicated generally by the reference numeral 40. The system 40 shows a UE 41 with a plurality of panels, such as panels P1 and P2. The system further comprises a plurality of network nodes (e.g. gNB/TRP) consisting of: TRP1 having plurality of beams 42, 43, TRP2 having plurality of beams 44, 45, and TRP3 having plurality of beams 46, 47. The UE 41 may be receiving best SSB beams 43, 44, and 46 from different network nodes/transmission reception points TRP1, TRP2, and TRP3 respectively, where the beams 43,44, and 46 may have different SSB index, such that the UE may be required to transmit preamble signals (PRACH preamble) at three different times (RACH occasions). FIG. 5 is an illustration of an example plot 50 for sending channel preamble messages. As seen from plot 50, a first PRACH preamble message is sent to TRP2 at a first RO (RO #1), a second PRACH preamble message is sent to TRP1 at a fourth RO (RO #4), and a third PRACH preamble message is sent to TRP2 at a fifth RO (RO #5).

In a scenario as described with respect to FIGS. 3 to 5, a UE may consume power for sending multiple PRACH preamble messages to multiple TRPs, where the power consumption might be significant when the UE is in idle/inactive mode, and may cause reduction in battery life. In case the UE is using different panels for different TRPs, there could be hardware limitations (e.g. inter panel switching time) preventing the UE from transmitting in two sequential ROs using different panels, which may cause the total transmission time for transmitting all PRACH preamble messages to further be increased due to increased periodicity of the RO allocation.

In some example embodiments, for UE positioning in idle and/or inactive UEs, there may be time delays or beam alignment problems due to the UE being idle and/or inactive. Additionally, or alternatively, a UE may be required to split the preamble signal to different panels of the UE, such that the maximum power level allowed in the current standard (e.g. 23 dBm) may have to be distributed among the panels of the UE, thus reducing the power per panel. Alternatively, or in addition, the UE may use the RACH framework, where the UE may send preambles to each base station sequentially on each RACH occasion with a selected panel (e.g. best corresponding panel). However, such sequential PRACH preamble transmissions may cause high power consumption on the UE (e.g. thus being undesirable while the UE is in idle/inactive mode), and/or may cause delays in obtaining positioning estimates.

Some example embodiments described below provide techniques aimed at reducing the number of PRACH transmissions by the UEs, while still being suitable for sending PRACH transmissions to a plurality of base stations for optimal positioning estimation.

Figure 6:
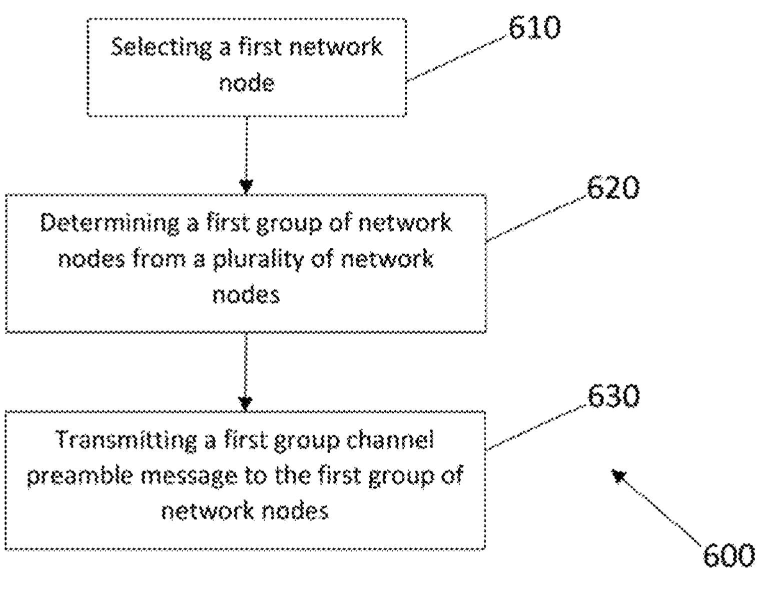
FIGS. 6 to 8 are flowcharts of algorithms in accordance with example embodiments.

FIG. 6 is a flowchart of an algorithm (e.g. a method), indicated generally by the reference numeral 600, in accordance with an example embodiment. The operations of algorithm 600 may be performed at a user device (e.g. UE), such as the user device 3 described with reference to FIG. 1.

The algorithm 600 starts at operation 610 where the user device selects a first network node from a plurality of network nodes (e.g. network nodes 4*a*, 4*b*, 4*c*) in response to receiving a positioning message from one or more of the plurality of network nodes. The first network node may be selected based on determining that highest transmission power is required for transmission of a channel preamble message (e.g. PRACH preamble message) to said first network node in comparison with transmission to other ones of the plurality of network nodes. In an example embodiment, the selection of the first network node may comprise measuring signal power for the plurality of network nodes for one or more antenna panels of the first user device in order to determine the first network node for which the highest transmission power is required.

Next, at operation 620, the user device determines a first group of network nodes from the plurality of network nodes, where the first group of network nodes are suitable for receiving a first group channel preamble message from the user device during a same random access channel (RACH) occasion as that of the first network node.

At operation 630, the user device transmits the first group channel preamble message to the first group of network nodes at a first random access channel occasion. In some example embodiments, group channel preamble transmission may allow the user device in idle/inactive state to use minimal power for PRACH transmissions (e.g. all required PRACH transmissions), as the first group channel preamble message can be sent at a single RACH occasion, while still reaching multiple network nodes of the first group of network nodes.

In an example embodiment, the first group channel preamble message is transmitted to the first group of network nodes on a single user device panel.

In an example embodiment, the positioning message is based, at least partially, on a location determining information request (e.g. PRACH request) transmitted by a positioning module (e.g. positioning module 2, such as an LMF) to one or more of the plurality of network nodes. The location determining information request may comprise parameters comprising one or more of a reference signal received power threshold, a first number of network nodes for transmission of the group channel preamble message, identity of the one or more network nodes configured for receiving the group channel preamble message, and expected uplink preamble receiving power.

In an example embodiment, the determination (e.g. operation 620) of the first group of network nodes is based, at least in part, on one or more of the parameters comprised within the location determining information request.

In an example embodiment, as an initialization process (e.g. before operation 610), the user device may transmit a first message to a positioning module (e.g. positioning module 2, such as an LMF module). The first message may provide an indication that the user device supports group channel preamble message transmission.

In one example embodiment, the user device may transmit the first group preamble message, and further may perform the other operations of algorithm 600, while being in an idle and/or inactive mode.

In an example embodiment, the positioning message (received before performing operation 610) may be received from at least a serving network node (e.g. serving gNB or TRP) and optionally from one or more other network nodes. The positioning message may comprise information of a first number of network nodes for transmission of the group channel preamble message. For example, the positioning message received from one or more of the network nodes may comprise information obtained by the respective network node from a positioning module (e.g. LMF) such as the positioning module 2 described with reference to FIG. 1. In one example embodiment, the determined first group of network nodes may or may not cover all of the first number of network nodes as specified in the positioning message. In the event that all of the first number of network nodes has not been reached with the first group channel preamble message, the algorithm 600 may be repeated until all of the first number of network nodes has been reached, as discussed in further detail with reference to FIG. 7.

Figure 7:
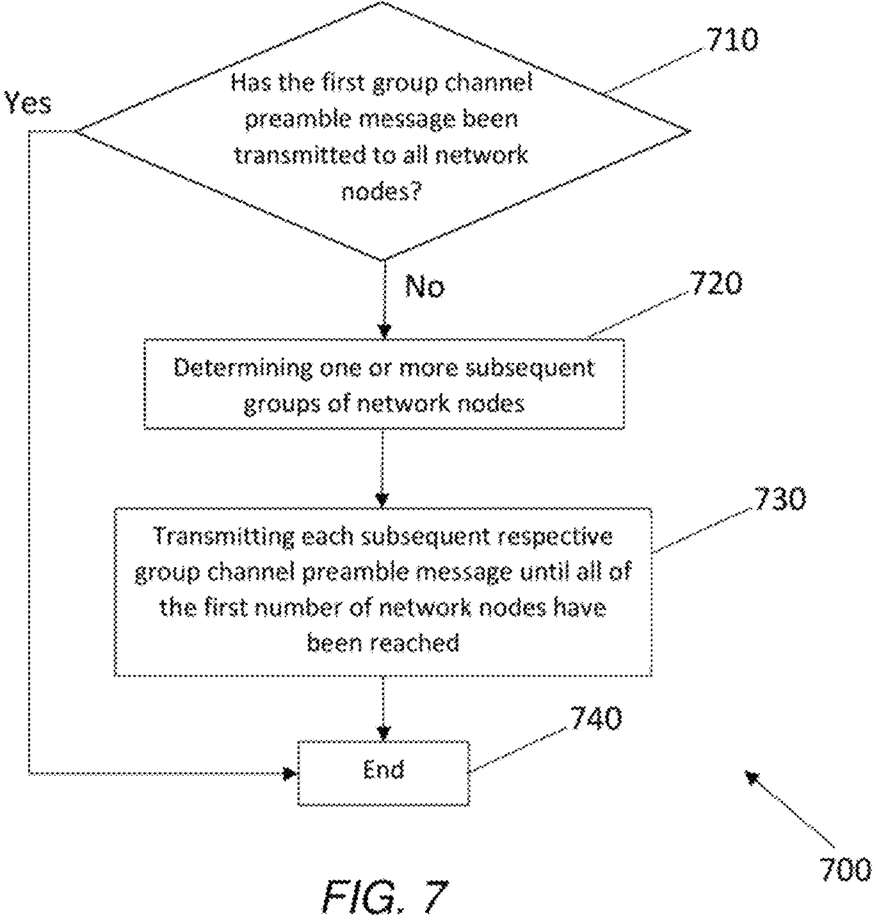

FIG. 7 is a flowchart of an algorithm, indicated generally by the reference numeral 700, in accordance with an example embodiment. In one example, the operations of algorithm 700 may be performed after the operations of algorithm 600.

At operation 710, the user device may determine whether the first group channel preamble message has been transmitted to all network nodes from the first number of network nodes, where the first number of network nodes may be specified in the positioning message received from one or more network nodes. If all network nodes from the first number of network nodes have been sent the first group channel preamble message, then the algorithm 700 may end at operation 740.

In the event that the first group channel preamble message has not been transmitted to all network nodes from the first number of network nodes, the algorithm 700 moves to operation 720, where the user device determines one or more subsequent groups of network nodes. Network nodes of a respective subsequent group of network nodes may be suitable for receiving a subsequent respective group channel preamble message from the user device during a respective same random access channel occasion. For example, determining the subsequent group of network nodes may be performed in a similar manner to the operation 620, where the subsequent groups of network nodes may be determined based on selection (e.g. similar to operation 610) of a subsequent first network node. A respective group channel preamble message may be transmitted to each of the one or more subsequent groups of network nodes using lower UE transmission power, where the transmission method may be similar to that of the transmission of the first group channel preamble message (e.g. transmitting to all TRPs of a group at the same RO).

Next, at operation 730, the user device may transmit each of the subsequent respective group channel preamble messages to each of the one or more subsequent groups of network nodes until a respective group channel preamble message has been sent to all network nodes from the first number of network nodes. The algorithm 700 may then end at operation 740.

Figure 8:
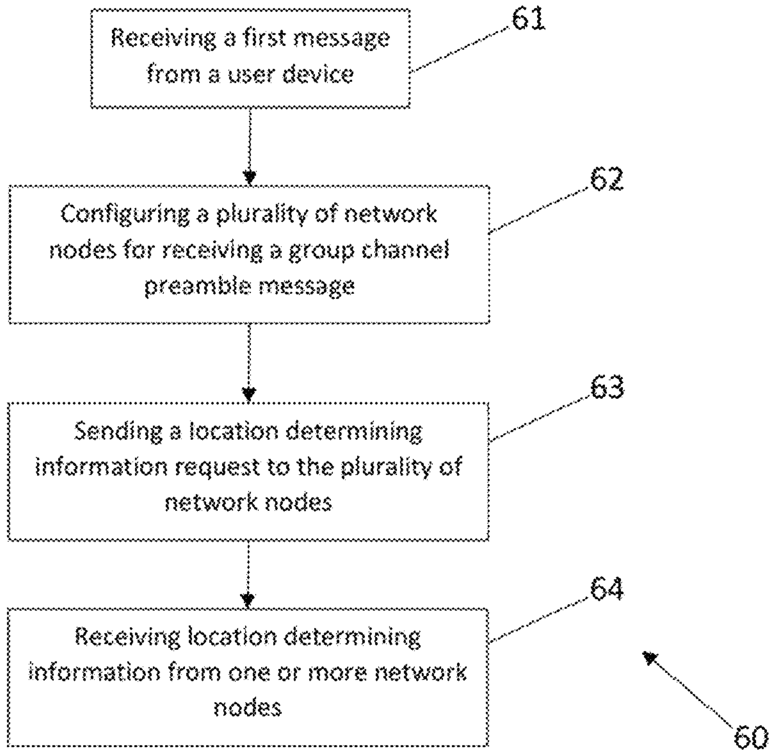

FIG. 8 is a flowchart of an algorithm, indicated generally by the reference numeral 60, in accordance with an example embodiment. The operations of the algorithm 60 may be performed at a positioning module, such as the positioning module 2 (e.g. LMF) as described with reference to FIG. 1.

At operation 61, a first message may be received from a user device, such as the user device 3 (e.g. UE) as described with reference to FIG. 1. The first message may provide an indication that the user device supports group channel preamble message transmission. In some example embodiments, group channel preamble transmission may be used for transmitting, by the user device, a group channel preamble message (e.g. PRACH preamble message) to a plurality of network nodes (e.g. gNBs or TRPs) in a single RACH occasion, thus allowing a user device in idle/inactive state to use minimal power for PRACH transmissions.

Next, at operation 62, a plurality of network nodes, such as network nodes 4*a*, 4*b*, and 4*c* as described with reference to FIG. 1, are configured for receiving a group channel preamble message (e.g. a positioning preamble message) from said user device. The plurality of network nodes may belong to a network node group. In an example embodiment, selection or determination of which network nodes belong to the network node group may be carried out at the user device (e.g. as described with reference to FIGS. 6 and 7, and further described below with reference to FIG. 11 and FIG. 13). In an example embodiment, the plurality of network nodes in the network node group comprises network nodes that are suitable for receiving the group channel preamble message during a single random access channel occasion. In an example embodiment, the group channel preamble message may comprise a physical random access channel (PRACH) preamble message.

In an example embodiment, the configuring operation may comprise sending a configuration message to each of the plurality of network nodes. In one example, said configuration message comprises a first preamble index. For example, the first preamble index may be used by the user device for positioning purposes. The first preamble index may be provided to the network node(s) so as to ensure that the network node(s) understand that the configuration is for PRACH positioning purposes, and the network node(s) do not initiate legacy RACH procedure with other types of messaging (e.g. Msg2, or the like).

In an example embodiment, the configuration message may or may not include information that the PRACH preamble message to be received from the UE is a group channel preamble message, or information that the UE supports group channel preamble transmission. As such, the network nodes may be configured in the same way for receiving group channel preamble messages or for receiving any positioning preamble message, such as generic PRACH preamble messages (e.g. individual PRACH preamble messages based on current standards).

At operation 63, a location determining information request is sent to said plurality of network nodes. As such, the positioning module requests information from the network node(s) that may allow the positioning module to estimate the position of the user device. In an example embodiment, the location determining information request may comprise one or more of a reference signal received power threshold, number of network nodes configured for receiving the group channel preamble message, identity of network nodes configured for receiving the group channel preamble message, expected uplink preamble receiving power. Said information comprised within the location determining information request may be conveyed by the network node(s) to the user device, and the user device may use one or more of said information for selecting one or more available network nodes for transmission (e.g. for transmission of the PRACH preamble message). In an example embodiment, one or more of the network nodes (e.g. at least a serving network node) may send a paging message to the user device for obtaining positioning information, where said paging message may include one or more of the above information provided within the location determining information request.

At operation 64, in response to said location determining information request, the positioning module may receive location determining information from one or more of the plurality of network nodes. In one example the location determining information may comprise one or more of time of arrival and angle of arrival relating to said group channel preamble message received by the respective network node from said user device.

In an example embodiment, the positioning module may determine and/or estimate the position of said user device based, at least in part, on the received location determining information.

Figure 9:
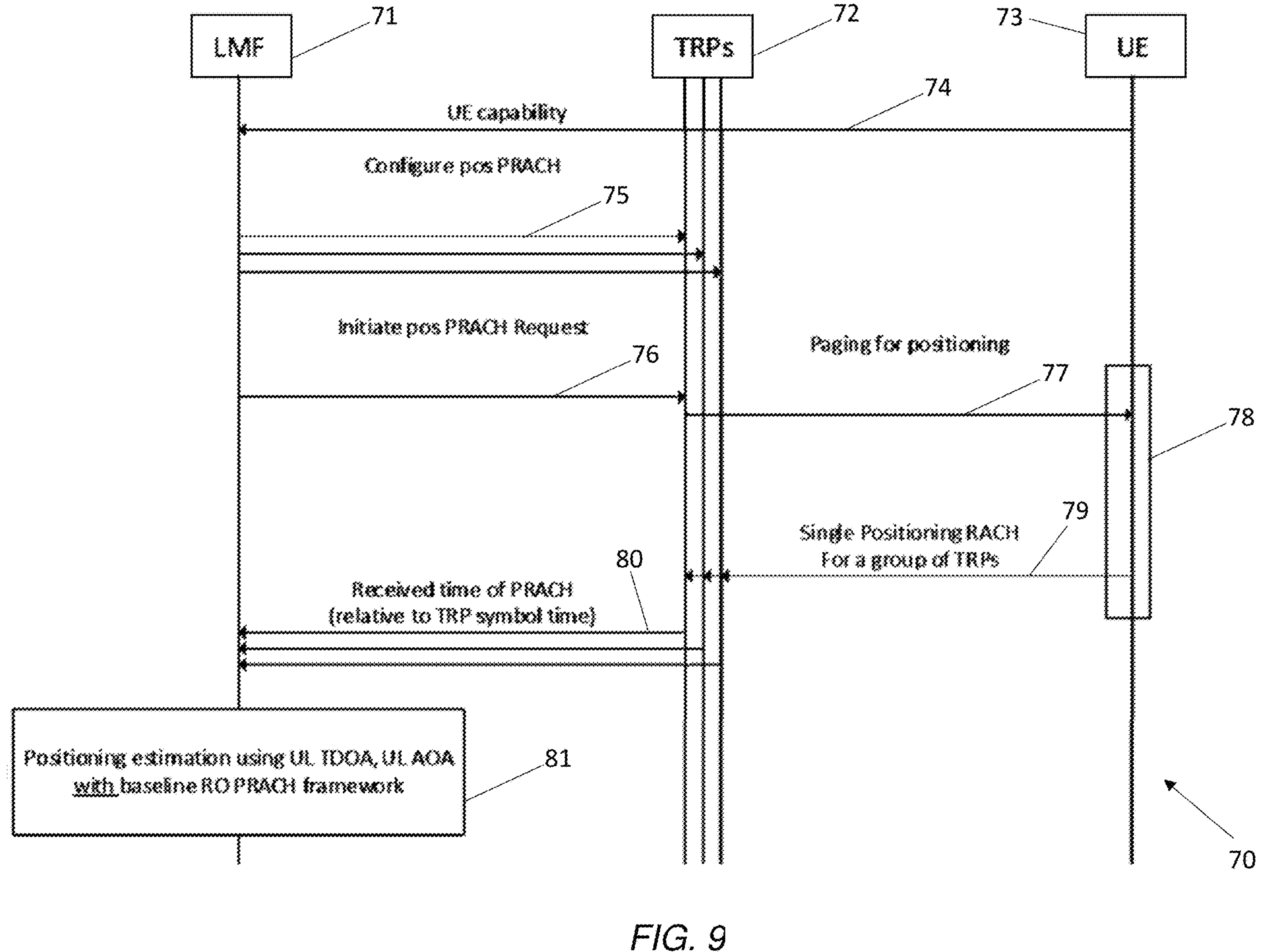
FIG. 9 is a message sequence of an algorithm in accordance with an example embodiment.

FIG. 9 is a message sequence of an algorithm, indicated generally by the reference numeral 70, in accordance with an example embodiment. The message sequence is an example implementation of the algorithm 60.

The algorithm 70 shows a signalling between a positioning module (e.g. LMF) 71, a plurality of network nodes (e.g. TRPs) 72, and a user device (e.g. UE) 73. The algorithm 70 may start with the user device 73 sending a message 74 (e.g. similar to the message received at operation 61) to the positioning module 71, where the message 74 indicates that the user device 73 supports group channel preamble message transmission. For example, message 74 may be an initialization message, where the user device 73 informs a network, including the positioning module 71, that the user device 73 supports enhanced PRACH transmission, such as group PRACH preamble message transmission, for positioning. In one example, information contained in message 74 may be added to existing capability information element (IE) corresponding to the user device 73.

Next, the positioning module 71 may configure (similar to operation 62) one or more of the plurality of network nodes 72, by sending configuration message(s) 75 to configure the network nodes to receive a group channel preamble message (e.g. a positioning preamble message) from the user device 73. For example, the positioning module 71 may configure one or more network nodes to receive positioning PRACH preamble message from one or multiple user devices, such as the user device 73. In one example embodiment, said configuration message comprises a first preamble index that may be used by the user device for positioning purposes.

When the positioning module 71 requires a new positioning estimate (e.g. for the user device 72), the positioning module 71 may then send a positioning PRACH request in message 76 (e.g. location determining information request, similar to operation 63) to one or more of the network nodes 72. For example, the message 76 may be sent at least to a serving network node (that is currently serving the user device 73), and may optionally be sent to one or more other network nodes 72. As described earlier, the message 76 may comprise parameters including one or more of a reference signal received power threshold, number of network nodes configured for receiving the group channel preamble message, identity of network nodes configured for receiving the group channel preamble message, expected uplink preamble receiving power.

In response to receiving the message 76, one or more of the network nodes 72 (including at least a network node of the serving cell of the user device 73) sends a paging message 77 to the user device 73 for positioning of the user device 73. The number of network nodes 72 requested to transmit the paging message 77 may be dependent upon an area (e.g. registration area) of the user device 73. For example, for user devices near cell edges or located in proximity to a plurality of network nodes, a plurality of network nodes may be requested by the positioning module to send the paging message 77 to the user device 73. In one example, the paging message(s) 77 comprises one or more of the parameters provided by the positioning module 71 in message 76.

At operation 78, in response to the paging message(s) 77, the user device 73 may initiate RACH transmission for positioning procedure. This may include the selection of a single RACH occasion for transmission of a group channel preamble message (PRACH preamble message). The user device 73 may select (e.g. similar to operation 610) one or more of the network nodes for transmission of the PRACH preamble message based, at least in part, on the one or more of the parameters provided by the positioning module in message 76, and included in the paging message 77.

The user device 73 may send (e.g. similar to operation 630) a group channel preamble message 79 (PRACH message) during a single RACH occasion, such that the message 79 is received by a group of the selected one or more network nodes 72. Each of the network nodes receiving the message 79 may then estimate one or more of a time of arrival (ToA) or angle of arrival (AoA) associated with the received group channel preamble message. The network nodes within the group may be synchronised, such that the ToA may be a relative time compared to a downlink symbol start time.

The positioning module 71 may receive, as messages 80, information of the ToA and/or AoA from the plurality of network nodes within the group, such that the positioning module 71 may determine the received time of all the PRACH preambles, and consequently determine time difference of arrival (TDOA). The received time may be relative to symbol times of the network nodes.

At operation 81, the positioning module may determine position of the user device 73 based on the location of the network nodes 72 (typically already known by the positioning module 71), TDOA (e.g. uplink TDOA) and/or AoA (e.g. uplink AoA) associated with the user device 73, received from a plurality of network nodes.

Figure 10:
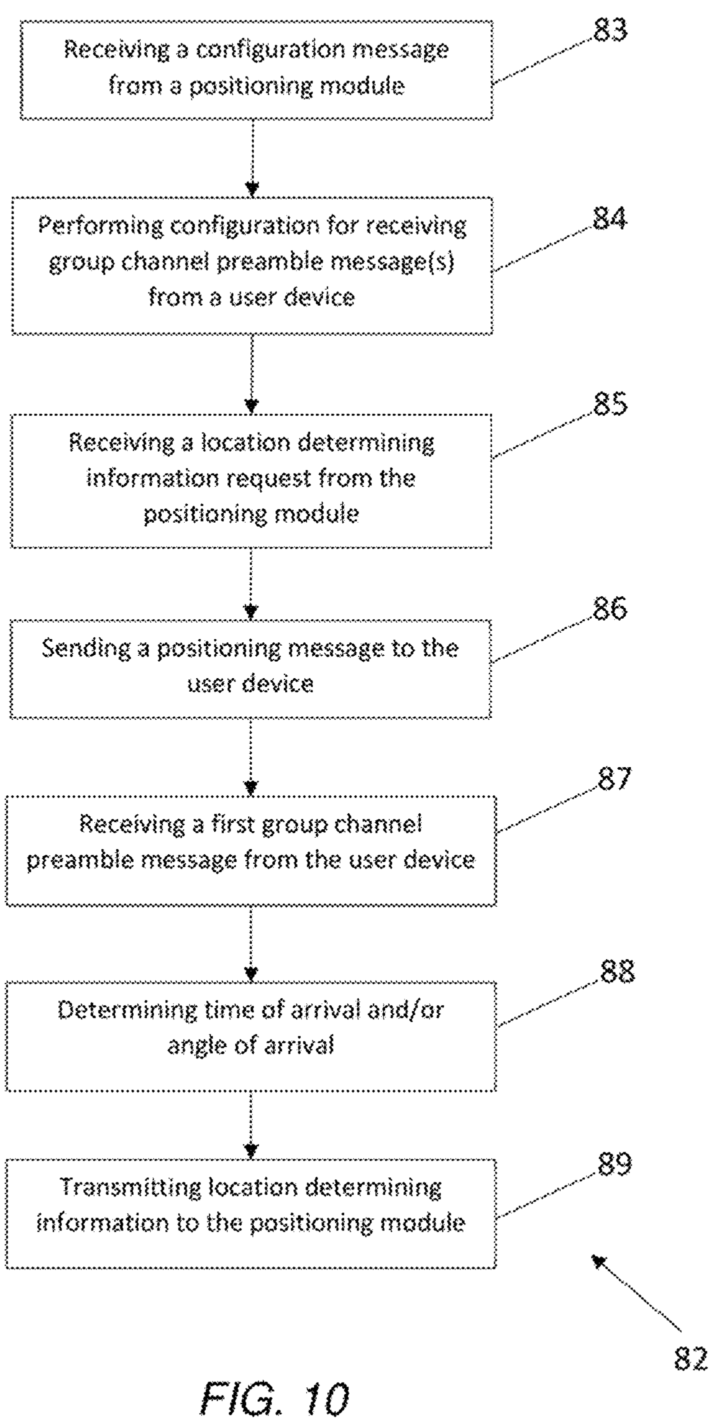
FIGS. 10 and 11 are flowcharts of algorithms in accordance with example embodiments.

FIG. 10 is a flowchart of an algorithm, indicated generally by the reference numeral 82, in accordance with an example embodiment. The operations of the algorithm 82 may be performed at a first network node, such as network nodes 4*a*, 4*b*, 4*c* (e.g. gNB or TRP) as described with reference to FIG. 1.

The first network node may be a part of a group of network nodes, wherein the group of network nodes are suitable for receiving the first group channel preamble message from the user device at a single random access channel occasion.

The algorithm 82 starts with operation 83, where a first network node receives a configuration message (e.g. message 75) from a positioning module (e.g. positioning module 1, LMF). Based on the received configuration message, at operation 84, the first network node performs configuration for receiving one or more group channel preamble messages (e.g. positioning preamble messages) from a user device (as described with reference to operation 62).

Next, at operation 85, a location determining information request (e.g. message 76) is received from the positioning module (e.g. as sent by the positioning module in operation 63). In response to receiving the location determining information request, the first network node sends, at operation 86, a positioning message (e.g. paging message 77) to the user device based, at least in part, on the received location determining information request. In some example embodiments, operation 86 may be performed by the first network node only when the first network node is a serving network node. In other examples, operation 86 may be omitted for the first network node, and may instead be performed by one or more other network nodes of the first group of network nodes. For example, the operation 86 may be performed by a serving network node (which may be any one of the network nodes of the first group of network nodes).

In response to the positioning message, at operation 87, the first network node receives a first group channel preamble message (e.g. positioning preamble message, similar to message 79) from the user device. In some examples, the first group channel preamble message may be received in response to a positioning or paging message sent from the first network node to the user device. Alternatively, or in addition, the first group channel preamble message may be received by the network node from the user device after the user device receives a positioning or paging message from another network node.

Next, at operation 88, the first network node determines one or more of a time of arrival and an angle of arrival associated with the first group channel preamble message (e.g. positioning preamble message). At operation 89, location determining information, such as the ToA and/or AoA, is transmitted to the positioning module (e.g. message 80). The positioning module may then determine a position of the user device based on said location determining information.

Figure 11:
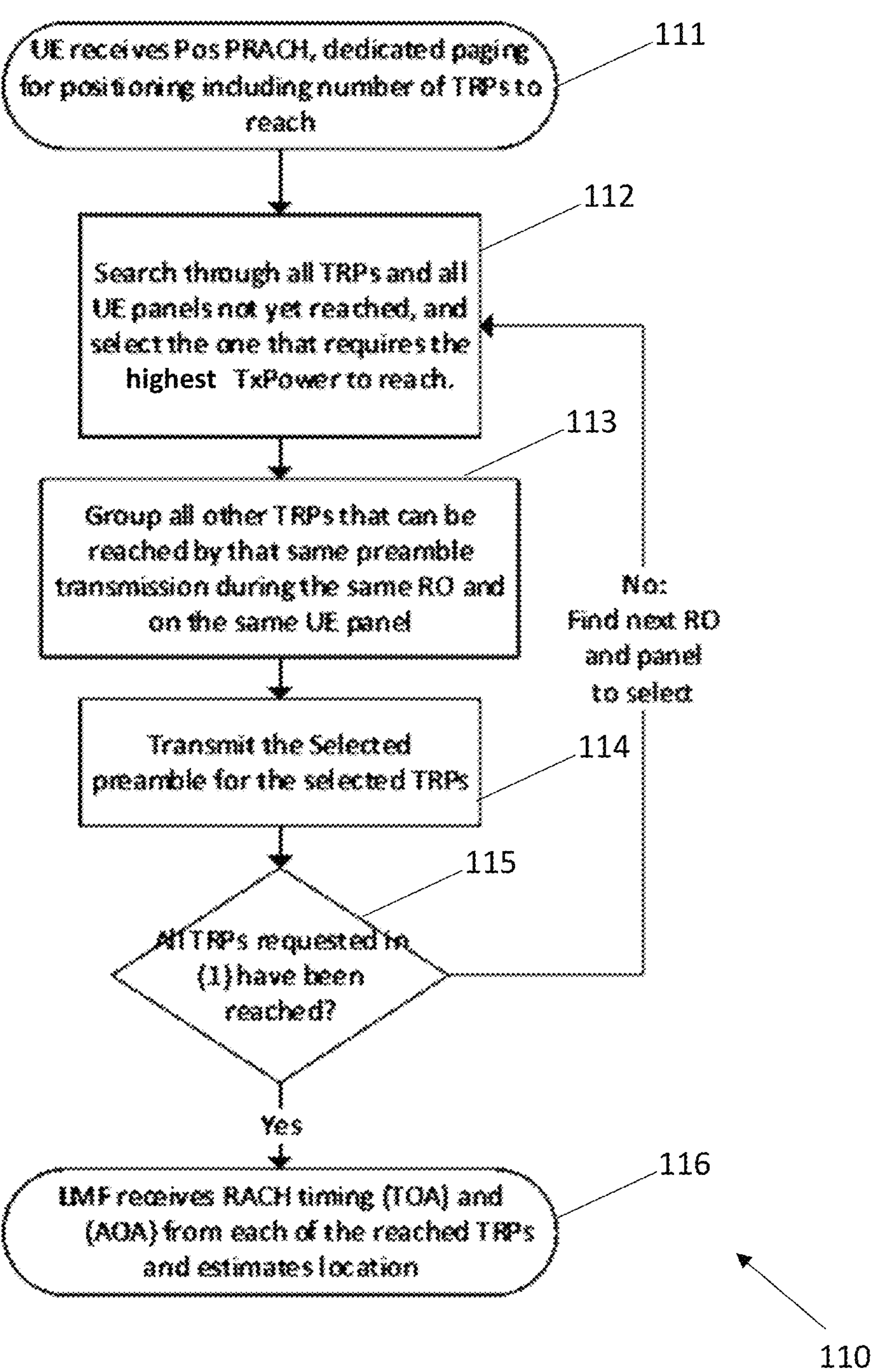

FIG. 11 is a flowchart of an algorithm, indicated generally by the reference numeral 110, in accordance with an example embodiment. The operations of the algorithm 110 may be performed at user device, such as user device 3 (e.g. UE) as described with reference to FIG. 1. The algorithm 110 may be an example implementation of algorithms 600 and 700.

At operation 111, the user device receives a positioning message (e.g. paging message 77) from at least a serving network node (e.g. may receive positioning messages from one or more other network nodes). The positioning message may comprise parameters, such as the number of network nodes (TRPs) that the user device is required to reach and send PRACH preamble message(s). The parameters comprised within the positioning message may be configured by a positioning module (e.g. LMF).

At operation 112, the user device searches through a plurality of available network nodes, for example, using all available panels of the user device. The user device may further select a first network node, where the first network node requires the highest transmission power (at the user device) to be reached and to transmit the PRACH preamble message(s).

At operation 113, the user device determines a first group of network nodes, where the first group of network nodes are selected based on being suitable for receiving a first group channel preamble message (PRACH message) from the user device during a same random access channel occasion as that of the first network node.

At operation 114, the group channel preamble message is transmitted to the first group of network nodes in a single RACH occasion.

At operation 115, the user device determines whether or not the group channel preamble message has been transmitted to the number of network nodes specified in the parameters of operation 111. If not, the user device may repeat the operations 112 to 114 for transmitting a new group channel preamble message to another group of network nodes at a different RACH occasion.

If the group channel preamble message has been transmitted to the number of network nodes specified in the parameters of operation 111, operation 116 is performed at the positioning module for estimating the position of the user device, where the positioning module receives RACH timings (e.g. based on ToA and/or AoA measurements from the network node(s) receiving the PRACH message from the user device).

Figure 12:
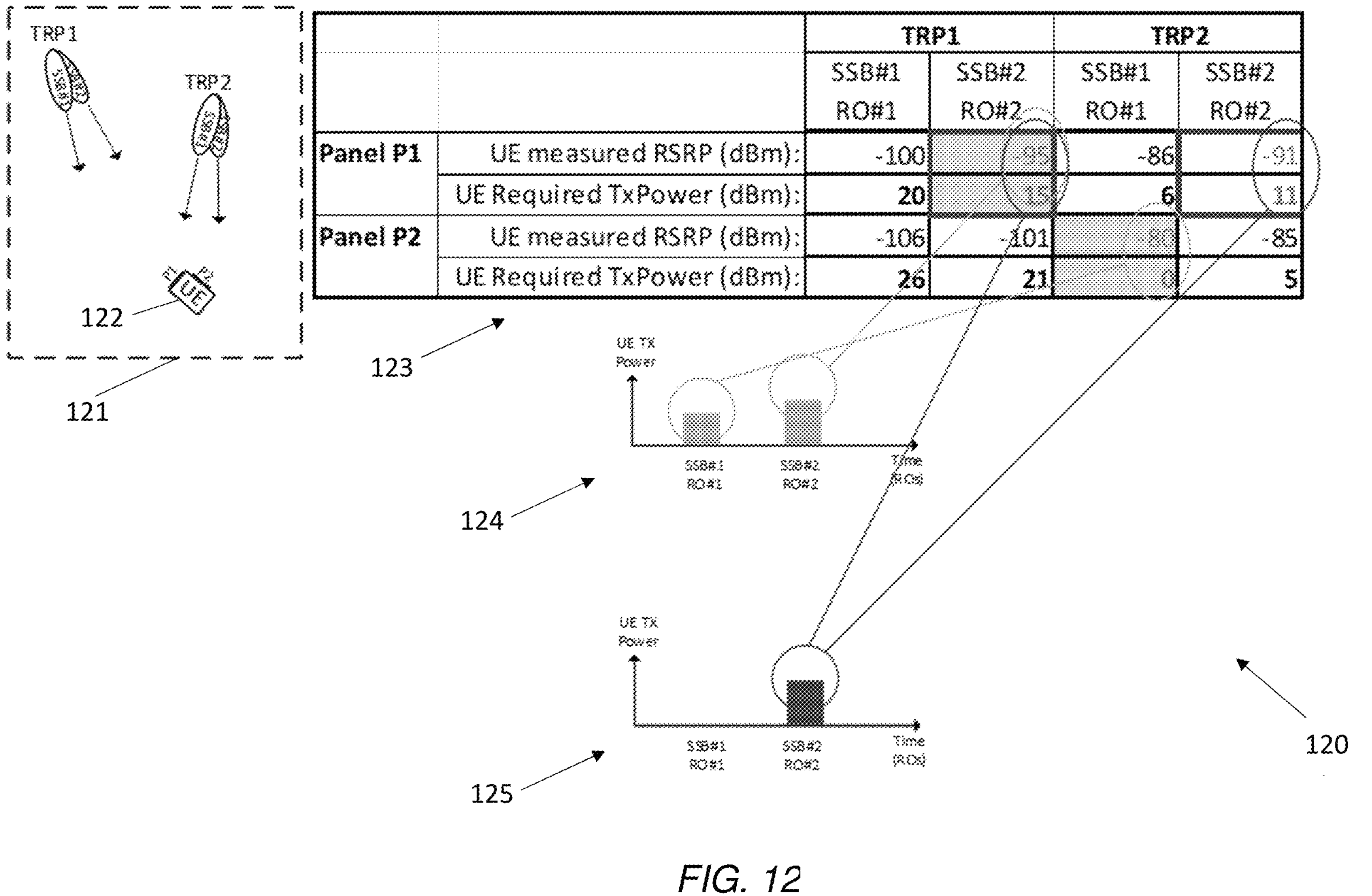
FIG. 12 is an illustration of an example scenario in accordance with an example embodiment.

FIG. 12 is an illustration, indicated by the reference numeral 120, of an example scenario in accordance with an example embodiment. The illustration 120 comprises a system 121 showing a user device (user equipment (UE)) 122 and network nodes (transmission-reception points) TRP1 and TRP2. Each of TRP1 and TRP2 may be transmitting two synchronization signal block (SSB) beams SSB #1 and SSB #2. The UE 122 may comprise two panels P1 and P2 which may be at 90 degree angle with respect to each other.

Table 123 illustrates RSRP measurements for various combinations of TRPs, SSBs, and panels of the UE 122. The UE 122 may select, for each TRP, an SSB received with highest RSRP measurement.

In a system where the UE 122 uses different panels P1 and P2 for different TRPs TRP1 and TRP2 respectively (e.g. as described with reference to FIGS. 3 to 5), power consumption at the UE 122 might be significant when the UE is in idle/inactive mode, and may cause reduction in battery life. Further, there may be hardware limitations (e.g. inter panel switching time) preventing the UE from transmitting in two sequential ROs using different panels, which may cause the total transmission time for transmitting all PRACH preamble messages to further be increased due to increased periodicity of the RO allocation.

Plot 124 shows transmission power of UE 122 with respect to time (RACH occasion) in a scenario where the UE 122 may measure reference signal received power (RSRP) from TRP1 and TRP2 using different panels P1 and P2 respectively. As shown in the table 123, for example, for TRP1, a signal with the highest RSRP (−95 dBm) is received using SSB #2 of TRP1 at panel P1. For TRP2, a signal with the highest RSRP (−80 dBm) is received using SSB #1 of TRP2 at panel P2. As shown in the plot 124, transmission of PRACH preambles for each TRP may require two transmissions of PRACH preambles, namely a first transmission at RO #1 (first RACH occasion) for TRP2 using panel P2, and a second transmission at RO #2 (second RACH occasion) for TRP1 using panel P1.

Plot 125 shows transmission power of UE 122 with respect to time (RACH occasion) in a scenario where UE 122 uses group channel preamble transmission (e.g. as described in algorithms 600, 700, 70, or 110) for transmission of the group channel preamble message to both TRPs TRP1 and TRP2 in a single RACH occasion. In this case, the same panel P1 may be used for transmission of a single PRACH preamble to TRP1 and TRP2 substantially simultaneously at the RO associated to SSB #2.

In an example embodiment, for each combination TRPs, SSBs, and panels of the user device (e.g. combinations described in table 123 of FIG. 12), the user device may calculate required transmission power and perform operations of algorithm 600 and 700 and/or 110.

For example, UE 122 may select (e.g. similar to operations 610, 112) a TRP (first network node) that requires the highest uplink transmission power, in comparison with all the required transmission power levels for all the specified TRPs. The UE 122 may then send PRACH preamble (which may be a group channel preamble message) for that TRP at its best SSB/RO (RO #2) index and using the best panel (P1) for that TRP. The first network node may be TRP1 requiring transmission power 15 dBm. The UE 122 may then search through the other TRPs and evaluate if any of them may be reached by the same PRACH preamble at the same RO as TRP1 and the used transmission power level (15 dBm) (such TRPs may be included in the first group of network nodes)

For example, the following formula may be used for determining other TRPs of for the first group of network nodes:

$$TxPower\_1>(TxPower\_2(RO\ \#2,P1)-Po\_Offset)$$

Where:

Po_Offset may be greater than or equal to 0 dB (e.g. assumed 0 dB for this example; 3 dB may be a default value)

TxPower_1: is the TxPower required by TRP1 (15 dBm)

TxPower_2(RO #2, P1): is the TxPower required by TRP2, when using RO #2 and P1 as selected for TRP1 (11 dBm)

In this example (15 dBm>11 dBm) indicating that TRP2 is able to hear the preamble that it transmitted to TRP1. Therefore, instead of transmitting preambles to both TRPs, UE 122 only transmits a single PRACH preamble (group channel preamble message) as shown in the plot 125, which single PRACH preamble is received by both TRP1 and TRP2.

Figure 13:
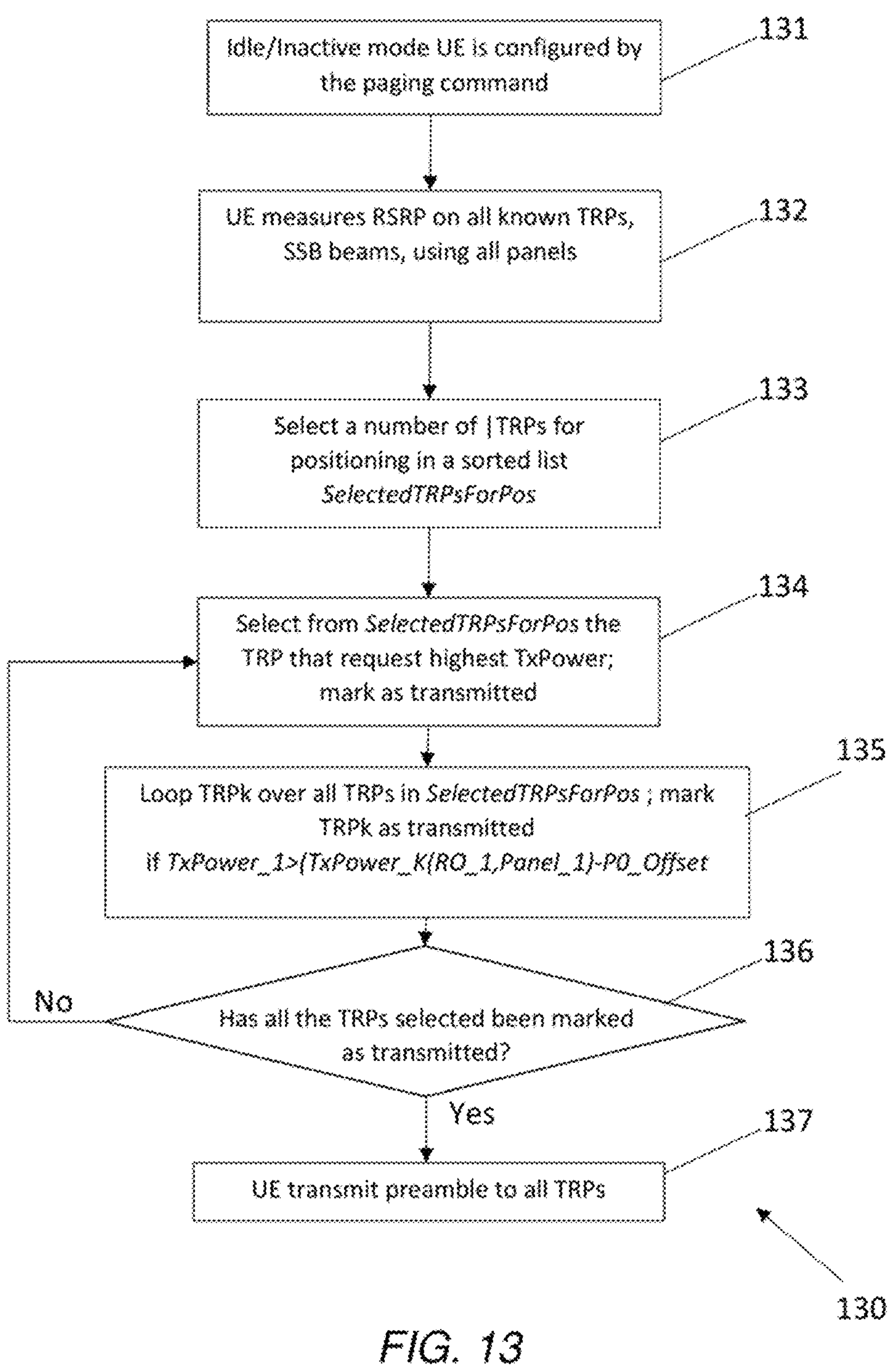
FIG. 13 is a flowchart of an algorithm in accordance with an example embodiment.

FIG. 13 is a flowchart of an algorithm, indicated generally by the reference numeral 130, in accordance with an example embodiment. The algorithm 130 may be an example implementation of the algorithms 600, 700, and 110.

At operation 131, the user device may be in an idle/inactive mode and may periodically listen for paging messages. When a paging message is received (e.g. positioning message received before operation 610, or message 77), the paging message may include a number of parameters to assist the user device in determining the number of TRPs (e.g. first number of network nodes, for example, as specified in operation 111) to which the user device is required to send PRACH preamble messages. Such parameters may include one of more of:

NumTRP: Indicating the number of TRPs and their specific Cell IDs to reach by the PRACH preamble transmission(s).

RSRP_TH: Absolute RSRP threshold indicating a minimum UE measured RSRP value of a TRP for selecting it for preamble transmission. The UE may select all TRPs that are received with RSRP above RSRP_TH, and include them in the list. If an RSRP_TH value is not present in the paging message, the UE may determine an RSRP_TH value (e.g. based on historical values).

Absolute_Po: Indicating the absolute Po (TRP expected UL preamble receive power) for the PRACH for positioning preambles. The UE may select all TRPs where the transmitted preamble can be received by the TRP with the power Absolute_Po, and include these TRPs in the list. Alternatively the UE is given a Po_Offset indicating a power offset to the legacy Po (Po_legacy), In that case the Po to use is (Po_legacy−Po_Offset). If the two parameters Absolute_Po and Po_Offset are absent the UE may arbitrarily select a value to use (e.g. based on historical values).

At operation 132, the user device (UE) may measure RSRP on all known TRPs (e.g. TRP1, TRP2), on all SSB beams (e.g. SSB #1, SSB #2) using all UE antenna panels (e.g. P1, P2). For each TRP measured, the UE may log, for each combination of UE panel and SSB beam, the corresponding RSRP value as well as the UE TxPower needed to reach the configured PO at the gNB. Additionally for each TRP, the UE may log the best UE Panel and SSB beam ID.

At operation 133, the UE may select one or more TRPs to include in a SelectedTRPsForPos list, which TRPs are selected for positioning purposes. The group of TRPs to include in the list may be selected by using one or more of the following parameters:

NumTRP: Indicating the number of TRPs to include in the SelectedTRPsForPos (e.g. as specified in a positioning message (e.g. paging from a TRP)). The NumTRP may be used for deciding the TRPs to be included in the list;

RSRP_TH: Indicating the RSRP threshold for selecting each TRP. The UE may select all TRPs that are received with RSRP above RSRP_TH, and include them in the list;

Absolute_Po or Po_Offset: Indicating the absolute Po (TRP expected UL preamble receive power) for the PRACH for positioning preambles. The UE may select all TRPs where the transmitted preamble can be received by the TRP with the power Absolute_Po, and include these TRPs in the list. Alternatively the UE is given a Po_Offset indicating a power offset to the legacy Po (Po_legacy), In that case the Po to use is (Po_legacy−Po_Offset)

In one example, the selected TRP list may be sorted based on required transmission power (TxPower) for preamble transmission.

At operation 134, the UE may select, from the SelectedTRPsForPos, the TRP (e.g. first network node), not yet marked as 'transmitted', that requires the highest TxPower for its best panel/beam combination. This TRP (TRPi) may be marked as 'transmitted', and its best panel/beam combination may be stored for later transmission. The RACH occasion (RO) and panel ID may be stored in RO_i and Panel_i, and its required Tx power is stored as TxPower_i.

At operation 135, among the TRPs listed for positioning to which UE has not yet transmitted a positioning PRACH preamble, the UE may evaluate if another TRP is reachable (sub-optimal beam and sub-optimal panel included in evaluation) with current panel and transmit power configuration corresponding to the transmission for TRPi (e.g. similar to operations 620, 113—determining the first group of network nodes). If one or more TRPs are identified in the evaluation, the UE may transmit a group PRACH preamble message to grouped TRPs. The UE may therefore not retransmit an individual PRACH preamble to each dedicated TRP of that group.

For example, the UE may look up all TRPs in SelectedTRPsForPos that are not yet marked as 'transmitted' (TRPk). For each TRPk, the UE may compare the required TxPower to reach said TRPk(s), using the selected panel/beam combination selected in operation 134 (RO_i, Panel_i, TxPower_i), with the TxPower_i. If the preamble transmission selected in operation 134 dedicated to TRPi can also reach TRPk, then TRPk may be marked as 'transmitted'. The determination of whether the preamble transmission may reach TRPk may be based on the following formula:

$$TxPower\_i>(TxPower\_k(RO\_i,Panel\_i)-Po\_Offset)$$

As such, if maximum transmission power associated with TRPi is higher than transmission power of TRPk minus Po_Offset, the UE may determine that TRPk can be reached by the same preamble transmission, and therefore TRPk may then be marked as transmitted.

At operation 136, if it is determined that not all TRPs in SelectedTRPsForPos has been marked as 'transmitted', then the algorithm 130 may move back to operation 134 for selecting an additional preamble(s) for transmission. At operation 137, the UE may transmit all the PRACH preambles stored in step 134.

Figure 14:
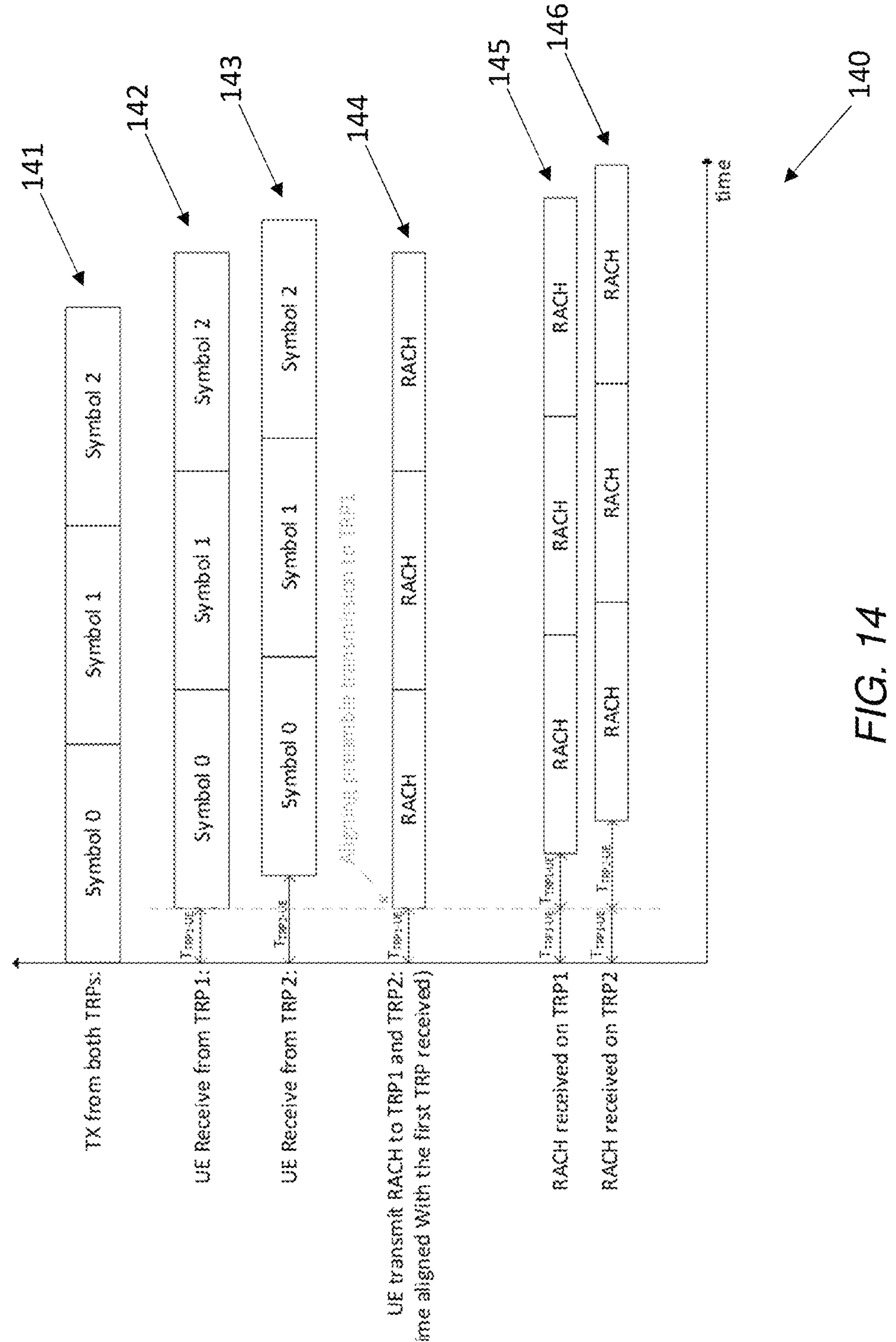
FIG. 14 is a block diagram showing timing for receiving and transmitting signals in accordance with an example embodiment.

FIG. 14 is a block diagram, indicated generally by the reference numeral 140, showing timing for receiving and transmitting signals in accordance with an example embodiment.

In some examples, in the conventional implementation of the PRACH preamble transmission used for Random Access Procedure (e.g. as described with reference to FIGS. 3 to 5), the time of transmission of the preamble may be aligned to the UE serving Cell (TRP) received time, and the preamble is sent to the serving cell only. The TRP, when receiving the preamble, may be able to estimate the distance between the TRP and UE.

In the example embodiments described above (algorithms 600, 700, 60, 70, 110) each transmitted preamble may be received by a plurality of TRPs, which may require the time of preamble transmission to be aligned to a single TRP. In some examples, the preamble transmit time may be aligned to the TRP that is received with the lowest propagation delay. Typically, this may be the TRP closest to the UE.

The block diagram 140 shows example timings and alignments with a plot of events associated with two TRPs (e.g. TRP1 and TRP2 described above with reference to FIG. 12) with respect to time.

For example, event 141 relates to transmission (Tx) from both TRP1 and TRP2. The TX timing of all the downlink (DL) signals from the TRPs are synchronised.

Event 142 relates to signal reception by the UE from TRP1, and event 143 relates to signal reception by the UE from TRP2. As the UE may be at different distances from TRP1 and TRP2, the signals from TRP1 and TRP2 may be received at different times corresponding to the distance the signal has travelled from the TRP to the UE. Therefore, a downlink signal from TRP1 may be received after a period $T_{TRP1\text{-}UE}$, while a downlink signal from TRP2 may be received after a period $T_{TRP2\text{-}UE}$ (e.g. after $T_{TRP1\text{-}UE}$ due to TRP2 being further away than TRP1).

Event 144 relates to transmission of PRACH preamble by the UE to TRP1 and TRP2. The transmission time may be aligned with the TRP received with the lowest propagation delay, which, in this example is TRP1. Therefore the PRACH preamble transmission time is after $T_{TRP1\text{-}UE}$.

Event 145 relates to reception of the PRACH preamble at TRP1. TRP1 may receive the PRACH preamble after $T_{TRP1\text{-}UE}+T_{TRP1\text{-}UE}$ (e.g. reception time is equal to $T_{TRP1\text{-}UE}$).

Event 146 relates to reception of the PRACH preamble at TRP2. TRP2 may receive the PRACH preamble after $T_{TRP1\text{-}UE}+T_{TRP2\text{-}UE}$ (e.g. reception time is equal to $T_{TRP2\text{-}UE}$).

In some example embodiments, the preamble signals used may be robust against the delays between events 145 and 146. There may be different preamble formats defined for FR2 (SCS 120 kHz) and they may all have different Cyclic Prefix Duration that support delays corresponding to cell ranges from 117 m to 1162 m.

In the example embodiments described above, the number of PRACH preambles transmitted to the TRPs may be reduced to one preamble message, rather than multiple preamble messages to multiple TRPs. By time-aligning the transmission of the preamble to the TRP first received, and by aligning the TX power used for preamble transmission to the weakest TRP (most far away), the embodiments may maximize the number of TRPs that can "hear" the UE transmitted PRACH preamble for positioning. In some examples, the UE behaviour of grouping PRACH preamble transmission to single RO (in order to minimize number of transmissions) may be scaled to multiple panels (hence multiple ROs, i.e. one per panel) for multi-panel UEs.

Figure 15:
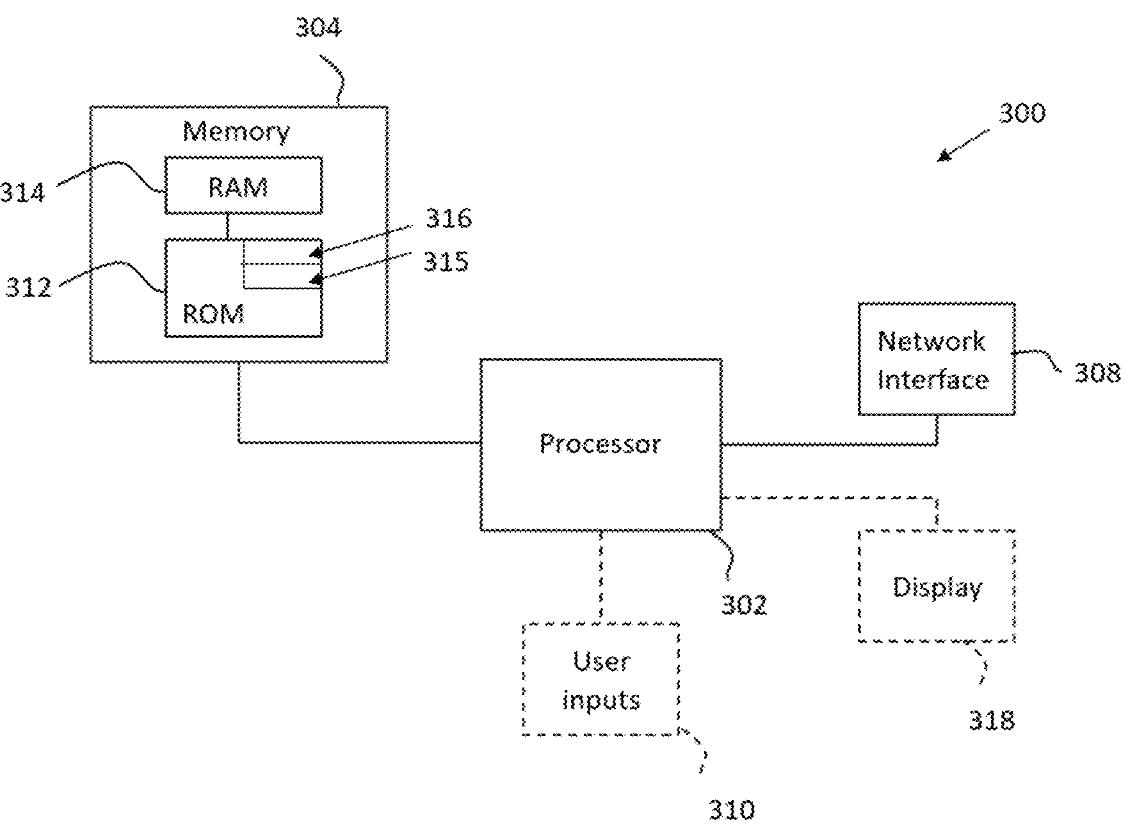
FIG. 15 is a block diagram of components of a system in accordance with an example embodiment.

For completeness, FIG. 15 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain computer program code which, when executed by the processor implements aspects of the algorithms 600, 700, 60, 70, 82, 110, and 130 described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16:
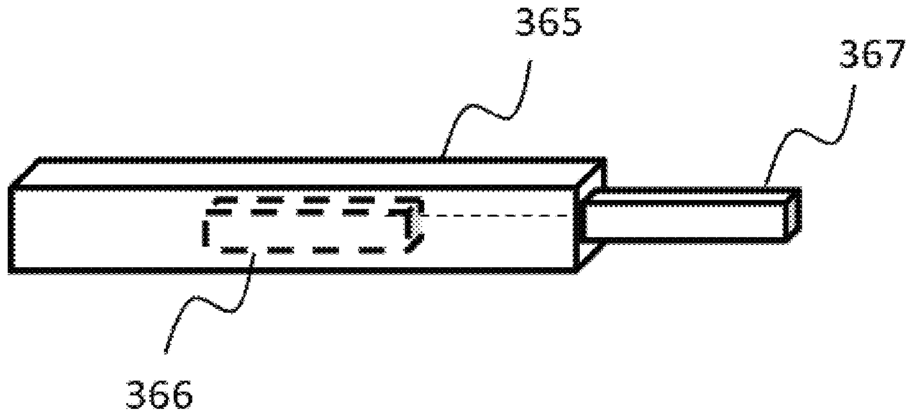
FIG. 16 shows an example of tangible media for storing computer-readable code which when run by a computer may perform methods according to example embodiments described above.

FIG. 16 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 6, 7, 8, 10, 11, 13, and message sequence of FIG. 9, are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A user device comprising:

at least one processor; and at least one memory storing instructions that, when executed by the at least one processor, cause the user device at least to:

select at least a first network node from a plurality of network nodes, in response to receiving, at the user device, a positioning message from one or more of the plurality of network nodes, wherein the first network node is selected based on determining that highest transmission power is required for transmission by the user device of a channel preamble message to said first network node in comparison with transmission by the user device to other ones of the plurality of network nodes;

determine a first group of network nodes from the plurality of network nodes, wherein the first group of network nodes are suitable for receiving a first group channel preamble message from the user device during a same random access channel occasion as that of the first network node; and transmit by the user device the first group channel preamble message to the first group of network nodes at a first random access channel occasion.

2. The user device as claimed in claim 1, wherein the positioning message comprises information of a first number of network nodes for transmission of the first group channel preamble message.

3. The user device is as claimed in claim 1, wherein the at least one memory stores instructions that, when executed by the at least one processor, cause the user device at least to:

determine whether the first group channel preamble message has been transmitted to all network nodes from the first group of network nodes;

determine one or more subsequent groups of network nodes, based on the first group channel preamble message having not been transmitted to all network nodes from the first group of network nodes, wherein each subsequent group of network nodes is suitable for receiving a subsequent respective group channel preamble message from the user device during a respective same random access channel occasion; and transmit each of the subsequent respective group channel preamble messages to each of the one or more subsequent groups of network nodes until a respective subsequent group channel preamble message has been sent to all network nodes from the first group of network nodes.

4. The user device as claimed in claim 1, wherein the positioning message is based, at least partially, on a location determining information request transmitted by a positioning module to one or more of the plurality of network nodes, wherein the location determining information request comprises parameters comprising one or more of a reference signal received power threshold, a number of the first group of network nodes for transmission of the first group channel preamble message, identity of one or more network nodes configured for receiving the first group channel preamble message, or expected uplink preamble receiving power.

5. The user device as claimed in claim 1, wherein the first group of network nodes is determined based, at least in part, on one or more, parameters comprised within a location determining information request.

6. The user device as claimed in claim 1, wherein the first group channel preamble message is transmitted to the first group of network nodes on a single user device panel.

7. The user device as claimed in claim 1, wherein the at least one memory stores instructions that, when executed by the at least one processor, cause the user device at least to: transmit a first message to a positioning module, wherein the first message provides indication that the user device supports group channel preamble message transmission.

8. The user device as claimed in claim 1, wherein the at least one memory stores instructions that, when executed by the at least one processor, cause the user device at least to: allow the user device to transmit the first group channel preamble message while the user device is in an idle mode.

9. The user device as claimed in claim 1, wherein the at least one memory stores instructions that, when executed by the at least one processor, cause the user device at least to: for selecting the first network node, measure signal power for the plurality of network nodes for one or more antenna panels of the user device.

10. A method comprising:

in response to receiving, at a user device, at least a positioning message from one or more of a plurality of network nodes, selecting at least a first network node from the plurality of network nodes, wherein the first network node is selected based on determining that highest transmission power is required for transmission by the user device of a channel preamble message to said first network node in comparison with transmission by the user device to other ones of the plurality of network nodes;

determining a first group of network nodes from the plurality of network nodes, wherein the first group of network nodes are suitable for receiving a first group channel preamble message from the user device during a same random access channel occasion as that of the first network node; and transmitting by the user device the first group channel preamble message to the first group of network nodes at a first random access channel occasion.

11. The method according to claim 10, wherein the positioning message comprises information of a first number of network nodes for transmission of the first group channel preamble message.

12. The method according to claim 10, comprising:

determining whether the first group channel preamble message has been transmitted to all network nodes from the first group of network nodes;

based on the first group channel preamble message having not been transmitted to all network nodes from the first group of network nodes, determining one or more subsequent groups of network nodes, each subsequent group of network nodes being suitable for receiving a subsequent respective group channel preamble message from the user device during a respective same random access channel occasion; and transmitting each of the subsequent respective group channel preamble message to each of the one or more subsequent groups of network nodes until a respective subsequent group channel preamble message has been sent to all network nodes from the first group of network nodes.

13. The method according to claim 10, wherein the user device is suitable for transmitting the first group channel preamble message while the user device is in an idle mode.

14. The method according to claim 10, wherein the positioning message is based, at least partially, on a location determining information request transmitted by a positioning module to one or more of the plurality of network nodes, wherein the location determining information request comprises parameters comprising one or more of a reference signal received power threshold, a number of the first group of network nodes for transmission of the first group channel preamble message, identity of one or more network nodes configured for receiving the first group channel preamble message, or expected uplink preamble receiving power.

15. The method according to claim 10, wherein the first group of network nodes is determined based, at least in part, on one or more parameters comprised within a location determining information request.

16. The method according to claim 10, wherein the first group channel preamble message is transmitted to the first group of network nodes on a single user device panel.

17. The method according to claim 10, further comprising: transmitting a first message to a positioning module, wherein the first message provides indication that the user device supports group channel preamble message transmission.

18. The method according to claim 10, further comprising, for selecting the first network node, measuring signal power for the plurality of network nodes for one or more antenna panels of the user device.

19. A non-transitory computer readable medium comprising program instructions that, when executed by an apparatus, cause the apparatus to perform at least the following:

in response to receiving, at a user device, at least a positioning message from one or more of a plurality of network nodes, selecting at least a first network node from the plurality of network nodes, wherein the first network node is selected based on determining that highest transmission power is required for transmission by the user device of a channel preamble message to said first network node in comparison with transmission by the user device to other ones of the plurality of network nodes;

determining a first group of network nodes from the plurality of network nodes, wherein the first group of network nodes are suitable for receiving a first group channel preamble message from the user device during a same random access channel occasion as that of the first network node; and transmitting by the user device the first group channel preamble message to the first group of network nodes at a first random access channel occasion.

20. The non-transitory computer readable medium as claimed in claim 19, wherein the positioning message is based, at least partially, on a location determining information request transmitted by a positioning module to one or more of the plurality of network nodes, wherein the location determining information request comprises parameters comprising one or more of a reference signal received power threshold, a number of the first group of network nodes for transmission of the first group channel preamble message, identity of one or more network nodes configured for receiving the first group channel preamble message, or expected uplink preamble receiving power.

* * * * *